(12) United States Patent
Kim et al.

(10) Patent No.: US 12,580,600 B2
(45) Date of Patent: Mar. 17, 2026

(54) TRANSMISSION DEVICE AND ELECTRONIC DEVICE INCLUDING SAME

(71) Applicant: SAMSUNG ELECTRONICS CO., LTD., Suwon-si (KR)

(72) Inventors: Jungjoon Kim, Suwon-si (KR); Yongjun An, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 511 days.

(21) Appl. No.: 18/110,534

(22) Filed: Feb. 16, 2023

(65) Prior Publication Data

US 2023/0198563 A1     Jun. 22, 2023

Related U.S. Application Data

(63) Continuation of application No. PCT/KR2021/010901, filed on Aug. 17, 2021.

(30) Foreign Application Priority Data

Aug. 24, 2020     (KR) ........................ 10-2020-0106342

(51) Int. Cl.
*H04B 1/04*         (2006.01)
(52) U.S. Cl.
CPC ................................. *H04B 1/0483* (2013.01)
(58) Field of Classification Search
CPC .......... H04B 1/0483; H04B 2001/0408; H04B 2001/045; H04B 1/04; H04B 1/0458; Y02D 30/70
See application file for complete search history.

(56) References Cited

U.S. PATENT DOCUMENTS

| | | | | |
|---|---|---|---|---|
| 4,763,197 | A | * | 8/1988 | Masuda ................. H04N 25/60 |
| | | | | 348/E5.079 |
| 9,515,622 | B2 | | 12/2016 | Nentwig et al. |
| 10,090,809 | B1 | | 10/2018 | Khlat |
| 10,389,308 | B2 | | 8/2019 | Mao |
| 10,439,685 | B2 | | 10/2019 | Pehlke et al. |

(Continued)

FOREIGN PATENT DOCUMENTS

| | | |
|---|---|---|
| CN | 107112954 A | 8/2017 |
| CN | 110380741 | 10/2019 |

(Continued)

OTHER PUBLICATIONS

Office Action dated Jun. 13, 2024 in Korean Patent Application No. 10-2020-0106342 and English-language translation.

(Continued)

*Primary Examiner* — Dominic E Rego

(74) *Attorney, Agent, or Firm* — Nixon & Vanderhye, P.C.

(57)          ABSTRACT

An example electronic device may include a switch configured to perform switching using at least two bias voltages input from a plurality of power suppliers as an input thereto and one of the two bias voltages as an output therefrom; and a first power amplifier which is included in at least one first transmission chain capable of selectively supporting the heterogeneous network among a plurality of transmission chains, and which is configured to amplify a radio frequency signal for transmission based on the bias voltage supplied from the switch.

12 Claims, 6 Drawing Sheets

(56) References Cited

U.S. PATENT DOCUMENTS

| | | | | |
|---|---|---|---|---|
| 11,190,138 | B2* | 11/2021 | Tanaka | H03F 3/72 |
| 2005/0128326 | A1* | 6/2005 | Korthout | H04N 25/766 |
| | | | | 348/E3.018 |
| 2007/0262893 | A1 | 11/2007 | Li et al. | |
| 2010/0128775 | A1 | 5/2010 | Kim et al. | |
| 2011/0136462 | A1* | 6/2011 | Dimpflmaier | H04B 1/036 |
| | | | | 455/343.1 |
| 2014/0307513 | A1* | 10/2014 | Chun | H02M 3/073 |
| | | | | 365/189.09 |
| 2015/0077579 | A1* | 3/2015 | Uemura | H04N 23/681 |
| | | | | 348/208.4 |
| 2015/0146846 | A1* | 5/2015 | Lee | H10F 39/195 |
| | | | | 378/31 |
| 2015/0244322 | A1* | 8/2015 | Hur | H03F 1/0211 |
| | | | | 330/296 |
| 2015/0244334 | A1 | 8/2015 | Hara | |
| 2016/0099686 | A1 | 4/2016 | Perreault et al. | |
| 2016/0105151 | A1 | 4/2016 | Langer | |
| 2016/0127060 | A1* | 5/2016 | Cross | H04W 52/52 |
| | | | | 375/211 |
| 2016/0173031 | A1 | 6/2016 | Langer | |
| 2016/0181995 | A1 | 6/2016 | Nentwig et al. | |
| 2016/0218674 | A1* | 7/2016 | Lin | H03F 3/245 |
| 2017/0005629 | A1 | 1/2017 | Yang et al. | |
| 2017/0040955 | A1 | 2/2017 | Yang et al. | |
| 2017/0201242 | A1* | 7/2017 | Zhu | H03K 19/018585 |
| 2018/0191363 | A1* | 7/2018 | Li | H03M 1/406 |
| 2018/0287563 | A1 | 10/2018 | Henzler et al. | |
| 2018/0309409 | A1* | 10/2018 | Khlat | H03F 1/0288 |
| 2018/0316311 | A1 | 11/2018 | Gebeyehu et al. | |
| 2018/0367099 | A1 | 12/2018 | Kim et al. | |
| 2019/0018467 | A1* | 1/2019 | Patterson | G06F 13/362 |
| 2020/0136561 | A1 | 4/2020 | Khlat et al. | |
| 2020/0136562 | A1 | 4/2020 | Kim et al. | |
| 2020/0154434 | A1 | 5/2020 | Balteanu | |
| 2021/0226672 | A1 | 7/2021 | Cho et al. | |

FOREIGN PATENT DOCUMENTS

| | | |
|---|---|---|
| JP | 7-336216 | 12/1995 |
| JP | 2010-011062 | 1/2010 |
| KR | 10-2007-0110796 | 11/2007 |
| KR | 10-1664718 | 10/2016 |
| KR | 10-1664732 | 10/2016 |
| KR | 110622412 A | 12/2019 |
| KR | 10-2065991 | 1/2020 |
| KR | 10-2020-0034551 | 3/2020 |
| KR | 10-2020-0047164 | 5/2020 |

OTHER PUBLICATIONS

Extended Search Report dated Jan. 26, 2024 in European Patent Applicaton No. 21861961.7.

Office Action dated Feb. 24, 2025 in Korean Application No. 10-2020-0106342 and English-language translation.

Tsai et al., "Wide-Bandwidth and High-Linearity EnvelopeTracking Front-End Module for LTE-A Carrier Aggregation Applications", IEEE Transactions On Microwave Theory and Techniques, vol. 65, No. 11, Nov. 2017, 12 pages.

International Search Report for PCT/KR2021/010901, mailed Nov. 29, 2021, 5 pages.

Written Opinion of the ISA for PCT/KR2021/010901, mailed Nov. 29, 2021.

Office Action dated Nov. 18, 2025 in European Application No. 21861961.7.

Notice of Patent Grant dated Nov. 11, 2025 in Korean Application No. 10-2020-0106342 and English-language translation.

Office Action dated Jan. 19, 2026 in Chinese Application No. 202180072590.7 and English-language translation.

* cited by examiner

TRANSMISSION DEVICE AND ELECTRONIC DEVICE INCLUDING SAME

CROSS-REFERENCE TO RELATED APPLICATIONS

This application is a continuation of International Patent Application No. PCT/KR2021/010901 designating the United States, filed on Aug. 17, 2021, in the Korean Intellectual Property Receiving Office, and claiming priority to Korean Patent Application No. 10-2020-0106342, filed on Aug. 24, 2020, in the Korean Intellectual Property Office. The disclosures of each of these applications are incorporated by reference herein in their entireties.

BACKGROUND

Field

The disclosure relates to a device for transmitting a wireless signal and an electronic device including the same.

Description of Related Art

An electronic device includes a battery as a power supply. The battery can supply a voltage for operation of various elements included in the electronic device. The electronic device can include, for example, a smart phone, a wearable device, or a tablet personal computer that supports wireless communication.

An electronic device supporting wireless communication can transmit or receive a radio frequency signal (hereinafter referred to as 'RF signal') through one or multiple antennas. The electronic device supporting wireless communication can include at least one component for transmitting and/or receiving an RF signal. The component transmitting the RF signal can include, for example, a phase locked loop (PLL) or a power amplifier (PA). The PLL can provide a reference signal for converting a baseband signal (hereinafter referred to as 'BB signal') into a high frequency band signal, that is, an RF signal. The PA can amplify and output an RF signal before transmitting it through one or a plurality of antennas.

SUMMARY

Since power consumption in an electronic device supporting wireless communication may directly affect battery use time or performance, efforts to reduce power consumption have been continuously made. In an electronic device supporting wireless communication, for example, power consumed by a PA may represent a relatively high portion of total power consumption. For example, in an electronic device in which a PA is directly coupled to a battery, when the PA operates in a low power region, power consumed as heat may be provided due to a high supply voltage (e.g., 'bias voltage').

According to various embodiments of the present disclosure, a transmission device for stably supplying a bias voltage for a power amplifier supporting wireless communication and an electronic device including the transmission device may be provided.

According to various embodiments of the present disclosure, a device and method for preventing (or reducing the possibility of) an internal circuit from being burned out due to a software error in an electronic device that shares one power amplifier in order to support dual transmission may be provided.

Technical effects to be achieved by the present disclosure are not limited to the technical effects mentioned above, and other technical effects may be also achieved within the range that may be clearly understood based on this disclosure.

According to various example embodiments, an electronic device may include a wireless communication circuit, a switch which performs switching, using at least two bias voltages inputted from a plurality of power suppliers as inputs thereto and one of the two bias voltages as an output therefrom, and a first power amplifier which is electrically connected to the wireless communication circuit, and is included in at least one first transmission chain among a plurality of transmission chains, and amplifies a radio frequency signal for transmission based on the bias voltage supplied from the switch.

According to various example embodiments, an electronic device may include at least one processor, a radio frequency integrated circuit (RFIC) for up-converting a baseband signal provided by the at least one processor into a radio frequency signal, and a front-end module for transmitting the radio frequency signal up-converted by the RFIC through multiple antennas. The front-end module may include a first power supplier supplying first and second bias voltages, based on a first envelope detection signal provided by the at least one processor, a second power supplier supplying third and fourth bias voltages, based on a second envelope detection signal provided by the at least one processor, a switch using the second bias voltage and the third bias voltage as inputs thereto, and outputting one of the second bias voltage and the third bias voltage as a fifth bias voltage, a first transmission module (e.g., including a transmitter) for amplifying a radio frequency signal up-converted by the RFIC using the first bias voltage outputted from the first power supplier, a second transmission module (e.g., including a transmitter) for amplifying a radio frequency signal up-converted by the RFIC using the fifth bias voltage outputted from the switch, and a third transmission module (e.g., including a transmitter) for amplifying a radio frequency signal up-converted by the RFIC using the fourth bias voltage outputted from the second power supplier.

According to various example embodiments, an electronic device may include a wireless communication circuit, a first power supplier supplying a first bias voltage, a second power supplier supplying a second bias voltage, a switch using the first bias voltage supplied from the first power supplier and the second bias voltage supplied from the second power supplier as inputs thereto, and supplying one of the first bias voltage and the second bias voltage as a third bias voltage, a first power amplifier included in at least one first transmission chain among a plurality of transmission chains, and amplifying a radio frequency signal by the third bias voltage supplied from the switch, and an antenna outputting the radio frequency signal amplified by the power amplifier.

According to various embodiments of the present disclosure, by stably supplying a bias voltage to a power amplifier in an electronic device, burnout of an internal circuit may be not only prevented or reduced and also higher efficiency of power consumption may be obtained.

Effects obtainable according to the present disclosure are not limited to the effects mentioned above, and other effects may be also provided as will be clearly understood from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
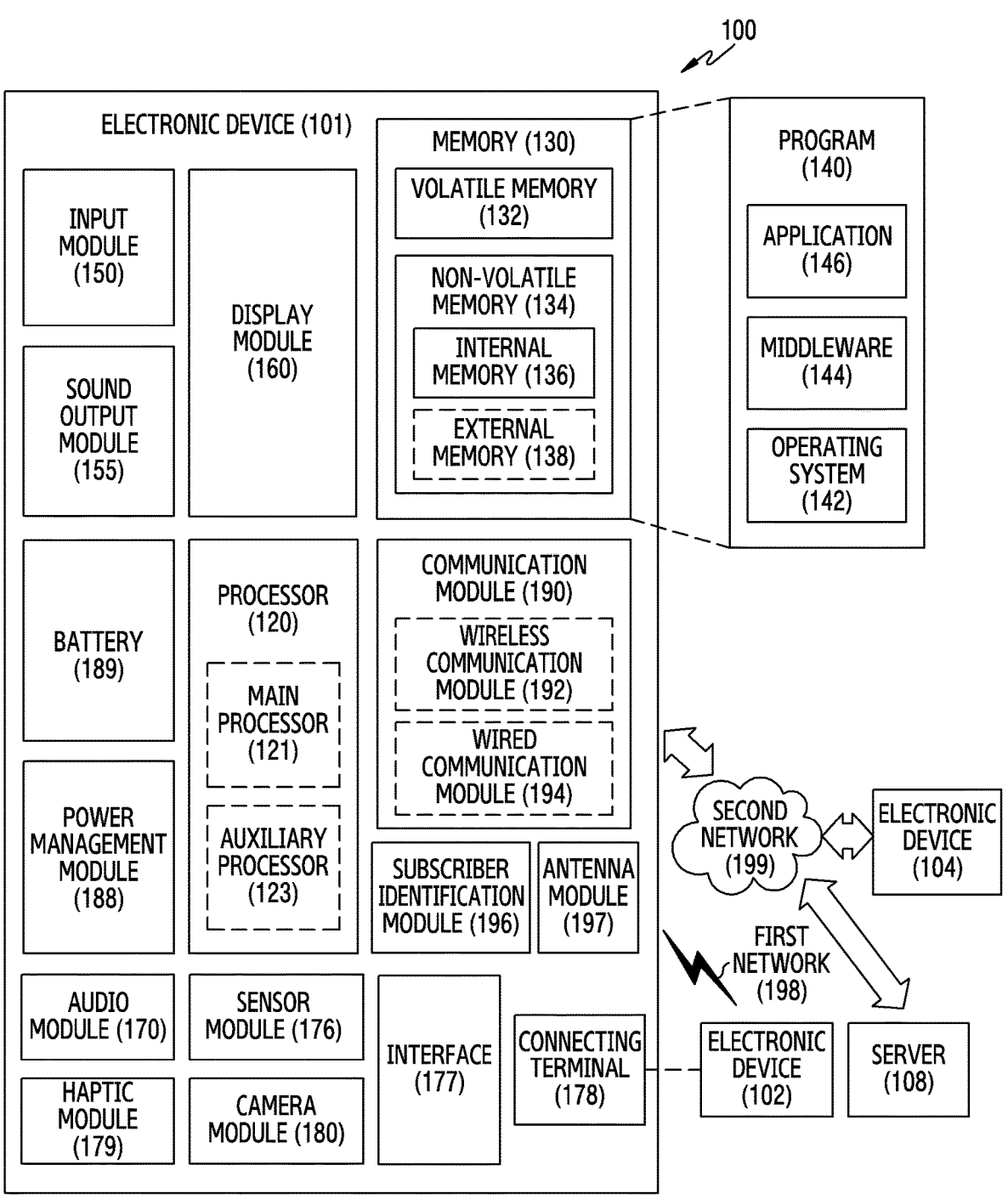
FIG. 1 is a block diagram of an example electronic device in a network environment according to various embodiments of the present disclosure.

Hereinafter, various example embodiments will be described in detail with reference to the accompanying drawings. For convenience of description, the size of components may be exaggerated or reduced in the drawings. For example, the size and thickness of each component shown in the drawings are arbitrarily shown for convenience of description, and it should be noted that various example embodiments are not necessarily limited as illustrated.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component(s) (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 2:
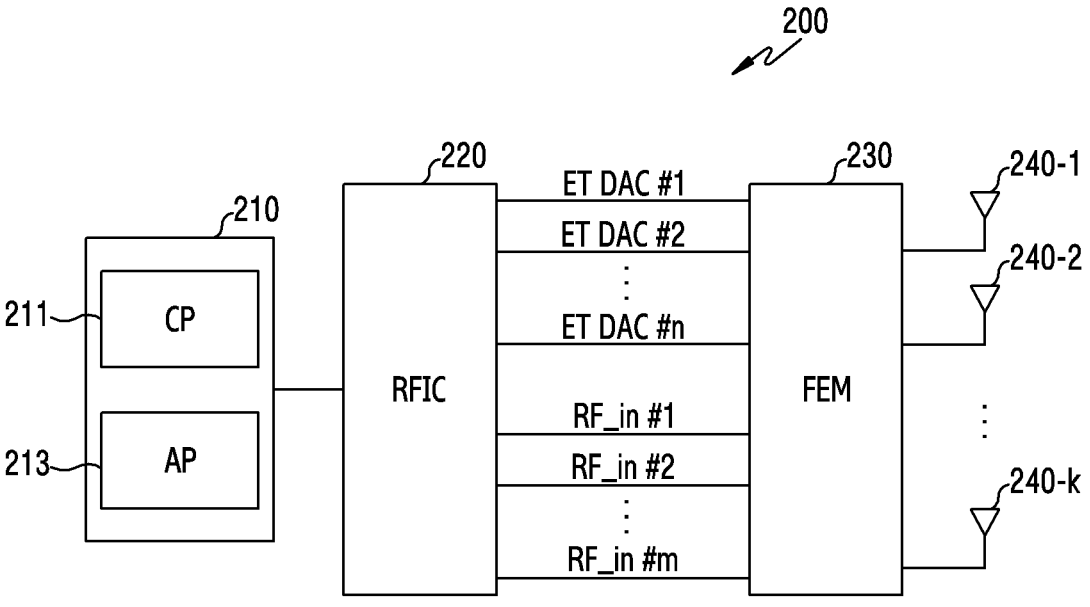
FIG. 2 is a diagram illustrating an example of components included to transmit a wireless signal in an example electronic device according to various embodiments of the present disclosure.

FIG. 2 is a diagram 200 illustrating an example of components included to transmit a wireless signal in an electronic device (e.g., the electronic device 101 of FIG. 1) according to various embodiments.

Referring to FIG. 2, the electronic device 101 of an embodiment may include at least one processor 210 (e.g., the processor 120 of FIG. 1), an RFIC 220, a front-end module (FEM) 230, and/or a plurality of antennas 240-1, 240-2 . . . 240-k. The electronic device 101 may further include at least one component among the components illustrated in FIG. 1. In an embodiment, the at least one processor 210, the RFIC 220, and/or the FEM 230 may be included in a wireless communication module (e.g., the wireless communication module 192 of FIG. 1).

According to an embodiment, the electronic device 101 may support communication in a plurality of frequency bands. The electronic device 101 may employ a dual connectivity technology supporting communication in a plurality of frequency bands, such as non-stand alone (NSA) and carrier aggregation (CA). For example, the electronic device 101 may support communication in at least one frequency band among a first frequency band (e.g., low band (LB)), a second frequency band (e.g., mid/high band (M/HB)), and a third frequency band (e.g., ultra-high band (UHB)). The electronic device 101 may provide dual connectivity by combining various frequency bands.

According to an embodiment, the at least one processor 210 may perform an operation for overall controlling of transmission and/or reception operations in the electronic device 101. The at least one processor 210 may determine a network to transmit a signal among heterogeneous networks, and set at least one transmission chain to transmit an RF signal to the determined network. The at least one processor 210 may control a path for supplying a bias voltage (or bias current, hereinafter collectively referred to as a bias voltage for convenience of description) for one or a plurality of PAs included in at least one transmission chain to transmit signals. For example, when there are three transmission chains, the at least one processor 210 may determine one or two transmission chains to process a signal from among the three transmission chains, and perform control for completing a path to apply a bias voltage to a PA provided for each of the determined one or two transmission chains.

According to an embodiment, the at least one processor 210 may include at least one of at least one communication processor (CP) 211 or at least one application processor (AP) 213.

According to an embodiment, the CP 211 may support establishment of a communication channel for supporting dual connectivity, and communication through the established communication channel. The CP 211 may support, for example, establishment of a communication channel of a first frequency band (e.g., LB) to be used for wireless communication with a first network (e.g., a cellular network), a second frequency band (e.g., M/HB) to be used for wireless communication with a second network (e.g., a cellular network), and/or a third frequency band (e.g., UHB) to be used for wireless communication with a third network (e.g., a 5G network), and communication through the established communication channel. The second network may be, for example, a legacy network that is one of second generation (2G), 3G, 4G, or long term evolution (LTE) networks. The third network may be, for example, a 5G network. The third frequency band (e.g., UHB) may be, for example, about 6 GHz to about 60 GHz. The CP 211 may also support establishment of a communication channel corresponding to another specified band (e.g., about 6 GHz or less) among bands to be used for wireless communication with the third network, and 5G network communication through the established communication channel.

According to an embodiment, the CP 211 may provide a baseband (BB) signal for transmission, and output the provided BB signal. The CP 211 may, for example, provide a BB signal to be transmitted through dual connectivity.

According to an embodiment, the RFIC 220 may up-convert the BB signal provided by the at least one processor 210 into an RF signal of an RF band (e.g., first, second and/or third frequency bands) required by the first, second, and/or third networks. The RFIC 220 may, for example, present RF signals (RF_in 1, RF_in 1 . . . RF_in m) up-converted for a plurality of networks, to the FEM 230. According to an embodiment, the RFIC 220 may, during transmission, track an envelope for each one or a plurality of RF signals, and present an envelope detection signal (ET_DAC 1, ET_DAC 2 . . . ET_DAC n) that is the tracking result to a power supplier (e.g., an envelope tracking (ET) modulator). The RFIC 220 may, for example, acquire a digital value by tracking the envelope of the RF signal, convert the acquired digital value into a linear analog signal, and output the same as the envelope detection signal.

According to an embodiment, the RFIC 220 may, during reception, down-convert an RF signal, which is received from the first, second and/or third networks through at least one of the plurality of antennas 240-1, 240-2 . . . 240-k and is preprocessed by the FEM 230, into a BB signal. The RFIC 220 may forward the down-converted BB signal to the at least one processor 210.

According to an embodiment, the FEM 230 may perform a preprocessing operation for transmitting, through the plurality of antennas 240-1, 240-2 . . . 240-k, RF signals (RF_in 1, RF_in 2 . . . RF_in m) provided from the RFIC 220. The FEM 230 may control power of the RF signals (RF_in 1, RF_in 2 . . . RF_in m) through the preprocessing operation. The FEM 230 may amplify the RF signals (RF_in 1, RF_in 2 . . . RF_in m) by, for example, a bias voltage (or driving voltage) provided according to a predetermined power supply method, and output. As the power supply method, at least one of an average power tracking (APT) method and/or an envelope tracking (ET) method may be used.

The APT method is a method of varying a bias voltage to be supplied to a PA using DC-DC converting. The APT method may obtain relatively high efficiency compared to a conventional method in which a bias voltage of a PA is directly supplied from a battery. However, in the APT method, power consumption due to heat may occur in the PA by supplying the bias voltage of the PA according to a peak level of an RF signal. The ET method is a method of varying a bias voltage to be supplied to the PA using a linear envelope signal acquired through tracking of an RF signal envelope. The ET method may obtain relatively high power efficiency compared to other power supply methods such as the conventional method and the APT method.

According to an embodiment, the FEM 230 may include a plurality of transmission modules (e.g., transmitters) so as to present dual connectivity or up-link CA. The FEM 230 may form a plurality of transmission chains by the plurality of transmission modules. The plurality of transmission chains may include, for example, at least one transmission chain capable of selectively supporting a plurality of frequency bands for servicing heterogeneous networks. The plurality of transmission modules may include a PA that amplifies an RF signal using a bias voltage controlled by a predetermined power supply method.

According to an embodiment, the electronic device 101 may include 'n' number of power supply devices, or the FEM 230. The FEM 230 may include, for example, 'm' number of transmission modules. The 'n' number of power supply devices may supply operating voltages to the FEM 230, based on the envelope detection signals (ET_DAC 1, ET_DAC 2 . . . ET_DAC n) provided from the RFIC 220. The 'n' number of power supply devices may, for example, include, or have separately externally, at least one switch for supplying an operating voltage to the FEM 230, based on the envelope detection signal (ET_DAC 1, ET_DAC 2 . . . ET_DAC n). The 'm' number of transmission modules may amplify one or a plurality of RF signals among 'm' number of RF signals by one or a plurality of bias voltages outputted by the 'n' number of power supply devices, and then transmit the same through the plurality of antennas 240-1, 240-2 . . . 240-k.

According to an embodiment, an ET technology for providing an envelope detection signal by envelope tracking may be applied to the 'n' number of power supply devices. The ET technology may be, for example, one technology for reducing power consumption of the PA in the electronic device 101. The ET technology is a technology of tracking an envelope of an RF signal, and supplying a bias voltage to a PA, based on the envelope of the RF signal. The ET technology enables the electronic device 101 to obtain high efficiency in a high power region.

Figure 3:
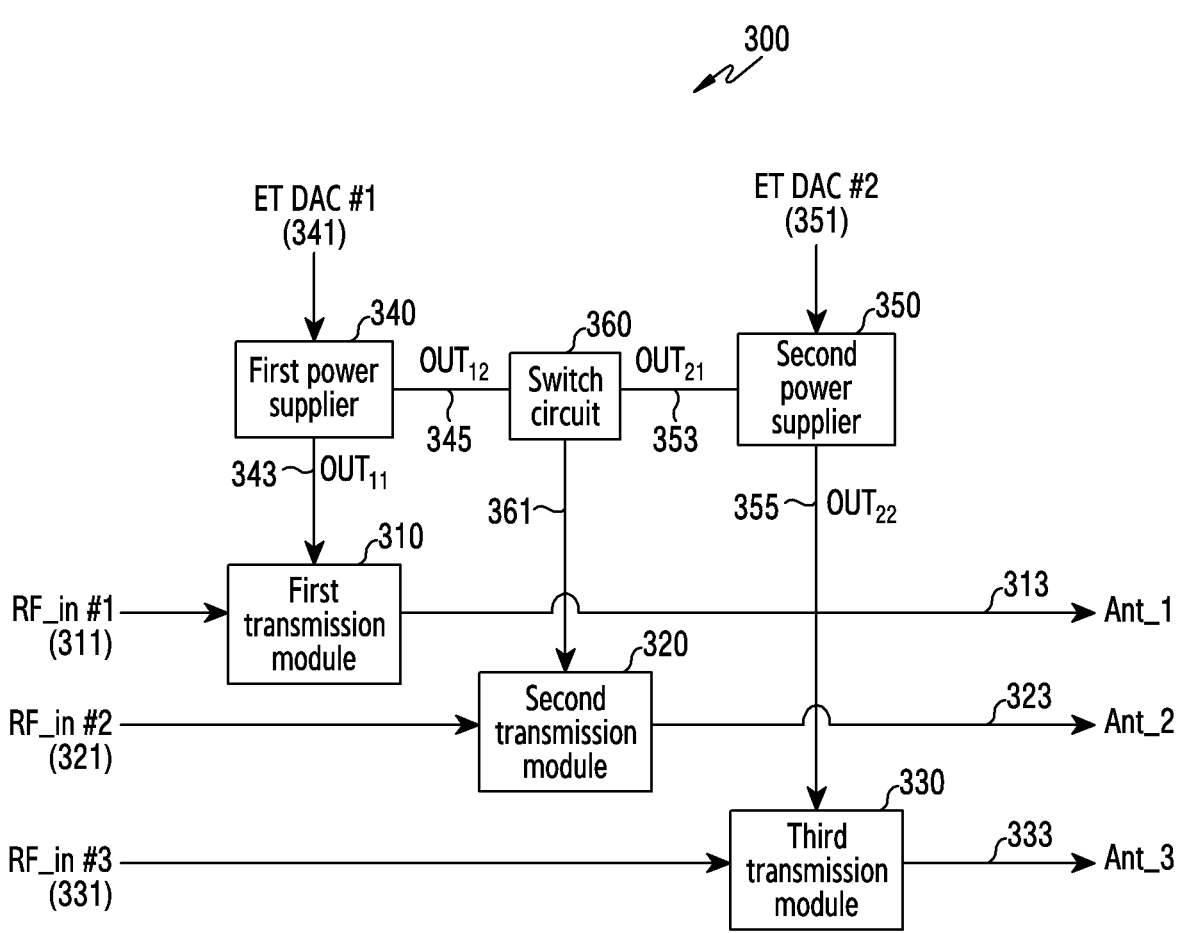
FIG. 3 is a diagram illustrating constructions of a front-end module and a power supplier in an example electronic device 101 according to various embodiments of the present disclosure.

FIG. 3 is a diagram 300 illustrating constructions of a front-end module (e.g., the FEM 230 of FIG. 3) and a power supplier in an electronic device (e.g., the electronic device 101 of FIG. 1) according to various embodiments.

Referring to FIG. 3, the electronic device of an embodiment may include an FEM 230, or at least two power suppliers 340 and 350. The FEM 230 of an embodiment may include at least one of a plurality of transmission modules 310, 320, and 330, or a switch circuit 360. The plurality of transmission modules 310, 320, and 330 may include, for example, a first transmission module 310 (e.g., including a transmitter), a second transmission module 320 (e.g., including a transmitter), and/or a third transmission module 330 (e.g., including a transmitter). The at least two power suppliers 340 and 350 may include, for example, a first power supplier 340 and/or a second power supplier 350.

According to an embodiment, the first power supplier 340 may supply a first bias voltage (OUT$_{11}$) 343 and a second bias voltage (OUT$_{12}$) 345, based on a first envelope detection signal (ET_DAC 1) 341 provided by an RFIC (e.g., the RFIC 220 of FIG. 2). The first bias voltage (OUT$_{11}$) 343 may be directly supplied as a bias voltage for driving the first transmission module 310. The second bias voltage (OUT$_{12}$) 345 may be supplied as one input voltage to the switch circuit 360.

According to an embodiment, the second power supplier 350 may supply a third bias voltage (OUT$_{21}$) 353 and a fourth bias voltage (OUT$_{22}$) 355, based on a second envelope detection signal (ET_DAC 2) 351 provided by the RFIC (e.g., the RFIC 220 of FIG. 2). The third bias voltage (OUT$_{21}$) 353 may be supplied as the other input to the switch circuit 360. The fourth bias voltage (OUT$_{22}$) 355 may be directly supplied as a bias voltage for driving the third transmission module 330.

According to an embodiment, as the output of the first power supplier 340 and the second power supplier 350 are divided into two, when the plurality of transmission modules (or PAs) are arranged in parallel, the first power supplier 340 and the second power supplier 350 may linearly amplify a wideband signal. For example, a power amplifier module (PAM) included in the transmission module may have an inherent capacitance of as little as tens of picofarads (pF) to as large as hundreds of pF, and when the PAM is made not to have a capacitance using the switch circuit 360, it may reduce a capacitance applied to the first power supplier 340 or the second power supplier 350 or a capacitance applied to a voltage supply path.

According to an embodiment, the switch circuit 360 may switch one of the second bias voltage (OUT$_{12}$) 345 inputted from the first power supplier 340 and the third bias voltage (OUT$_{21}$) 353 inputted from the second power supplier 350, to an output, and supply the same as a fifth bias voltage 361 for driving the second transmission module 320. The switch circuit 360 may include, for example, two single pole single throw (SPST) switches or one single pole double throw (SPDT) switch.

According to an embodiment, when the first power supplier 340 is directly connected to the first transmission module 310 supporting a second frequency band (e.g., M/HB), and the second power supplier 350 is directly connected to the third transmission module 330 supporting a third frequency band (e.g., UHB), the switch circuit 360 may be turned off. When the switch circuit 360 is turned off, internal capacitance may be reduced. For example, since an ET power supply, which is a power supply variable at high speed based on an envelope signal, is assumed a power supplier, a delay may occur when a large capacitance is applied to a power supply path. Accordingly, the capacitance on the power supply path may be reduced by physically disconnecting from unused components (e.g., an amplifier) within the electronic device 101.

According to an embodiment, the first transmission module 310, the second transmission module 320, or the third transmission module 330 may have a parallel structure, and each may form a unique transmission chain. One or a plurality of transmission modules among the first transmission module 310, the second transmission module 320, or the third transmission module 330 may be activated in accordance with a transmission mode considering a frequency band to transmit an RF signal. The first transmission module 310 may, for example, be activated by a control signal of a processor (e.g., the CP 211 or AP 213 of FIG. 2) and perform an operation for transmitting a first RF signal (RF_in 1) 311 in a first frequency band (e.g., LB) by the first bias voltage (OUT$_{11}$) 343 inputted from the first power supplier 340. The second transmission module 320 may, for example, be activated by a control signal of a processor (e.g., the CP 211 or AP 213 of FIG. 2) and perform an operation for transmitting a second RF signal (RF_in 2) 321 in the second frequency band (e.g., M/HB) by the fifth bias voltage 361 inputted from the switch circuit 360. The fifth bias voltage 361 may be a bias voltage selected by the switch circuit 360 among the second bias voltage ($OUT_{12}$) 345 provided by the first power supplier 340 or the third bias voltage ($OUT_{21}$) 353 provided by the second power supplier 350. The third transmission module 330 may, for example, be activated by a control signal of a processor (e.g., the CP 211 or AP 213 of FIG. 2) and perform an operation for transmitting a third RF signal (RF_in 3) 331 in the third frequency band (e.g., UHB) by the fourth bias voltage ($OUT_{22}$) 355 inputted from the second power supplier 350.

According to an embodiment, the second transmission module 320 may support dual connectivity of various combinations in order to support NSA. For example, the second transmission module 320 may amplify the RF signal of the second frequency band (e.g., M/HB) or amplify the RF signal of the third frequency band (e.g., UHB), by sharing the output of the first power supplier 340 and/or the output of the second power supplier 350. That is, the second transmission module 320 may be shared for dual transmission to heterogeneous networks.

According to an embodiment, an RF signal 313 processed by the first transmission module 310 may be transmitted through a first antenna (Ant_1). An RF signal 323 processed by the second transmission module 320 may be transmitted through a second antenna (Ant_2). An RF signal 333 processed by the third transmission module 330 may be transmitted through a third antenna (Ant_3).

According to an embodiment, the first transmission module 310 may include a first PA which is driven by the first bias voltage ($OUT_{11}$) 343. The second transmission module 320 may include a second PA which is driven by the fifth bias voltage 361. The third transmission module 330 may include a third PA which is driven by the fourth bias voltage ($OUT_{22}$) 355.

According to an embodiment, the first RF signal (RF_in 1) 311 may be transmitted through a first transmission chain including the first transmission module 310. The second RF signal (RF_in 2) 321 may be transmitted through a second transmission chain including the second transmission module 320. The third RF signal (RF_in 3) 331 may be transmitted through a third transmission chain including the third transmission module 330.

Figure 4:
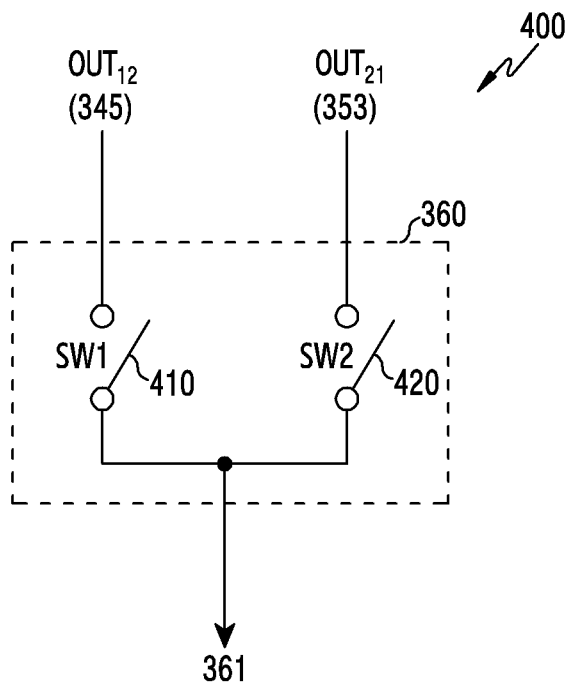
FIG. 4 is a diagram illustrating an example of a switch circuit for selectively outputting a bias voltage in a front-end module of an electronic device according to various embodiments of the present disclosure.

FIG. 4 is a diagram 400 illustrating an example of a switch (e.g., the switch circuit 360 of FIG. 3) for selectively outputting a bias voltage from an FEM (e.g., the FEM 230 of FIG. 2) in the electronic device 101 according to various embodiments.

Referring to FIG. 4, the switch circuit 360 of an embodiment may receive a second bias voltage ($OUT_{12}$) 345 supplied by a first power supplier (e.g., the first power supplier 340 of FIG. 3) and a third bias voltage ($OUT_{21}$) 353 supplied by a second power supplier (e.g., the second power supplier 350 of FIG. 3). The switch circuit 360 may perform a switching operation wherein one of the second bias voltage ($OUT_{12}$) 345 and the third bias voltage ($OUT_{21}$) 353 is outputted as a fifth bias voltage 361. The switch circuit 360 may be, for example, a double-pole single-throw (DPST) type. In an embodiment, the switch circuit 360 may include a first switch (SW1) 410 capable of outputting the second bias voltage ($OUT_{12}$) 345 as the fifth bias voltage 361, and a second switch (SW2) 420 capable of outputting the third bias voltage ($OUT_{21}$) 353 as the fifth bias voltage 361. For example, the first switch (SW1) 410 or the second switch (SW2) 420 may be a single-pole single-throw (SPST) type.

Figure 5:
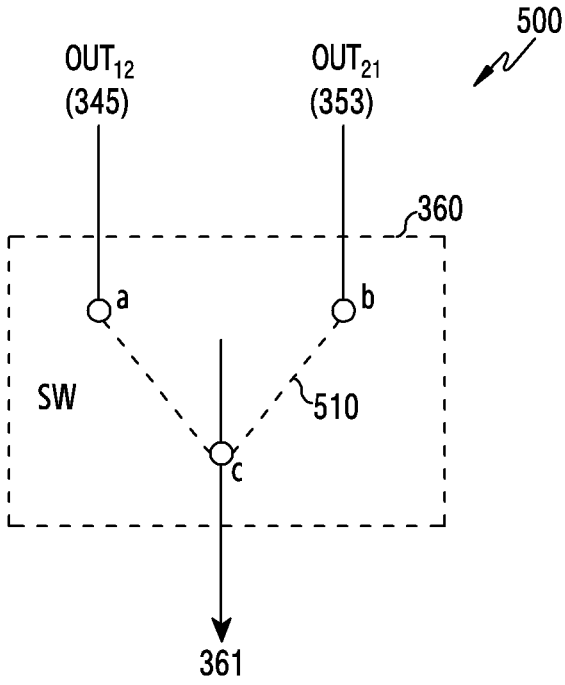
FIG. 5 is a diagram illustrating an example of a switch circuit for selectively outputting a bias voltage in a front-end module of an electronic device according to various embodiments of the present disclosure.

FIG. 5 is a diagram 500 illustrating an example of a switch (e.g., the switch circuit 360 of FIG. 3) for selectively outputting a bias voltage from an FEM (e.g., the FEM 230 of FIG. 2) in the electronic device 101 according to various embodiments.

Referring to FIG. 5, the switch circuit 360 of an embodiment may receive a second bias voltage ($OUT_{12}$) 345 supplied by a first power supplier (e.g., the first power supplier 340 of FIG. 3) and a third bias voltage ($OUT_{21}$) 353 supplied by a second power supplier (e.g., the second power supplier 350 of FIG. 3). The switch circuit 360 may perform a switching operation wherein one of the second bias voltage ($OUT_{12}$) 345 and the third bias voltage ($OUT_{21}$) 353 is outputted as a fifth bias voltage 361. The switch circuit 360 may be, for example, a double-pole single-throw (DPST) type. In this case, the switch circuit 360 may include a switch (SW) 510 that switches one of the second bias voltage ($OUT_{12}$) 345 and the third bias voltage ($OUT_{21}$) 353 as the fifth bias voltage 361. In an embodiment, the switch (SW) 510 may include a first terminal (a), a second terminal (b), or a third terminal (c). The first terminal (a) may be electrically connected to the first power supplier, and may receive the second bias voltage ($OUT_{12}$) 345 from the first power supplier. The second terminal (b) may be electrically connected to the second power supplier, and may receive the third bias voltage ($OUT_{21}$) 353 from the second power supplier. The third terminal (c) may be electrically connected to a transmission module (e.g., the second transmission module 320 of FIG. 3), and may supply the fifth bias voltage 361 to the transmission module by selectively connecting either the first terminal (a) or the second terminal (b) to the transmission module.

As illustrated in FIG. 5, when the switch circuit 360 is the DPST type, it is possible to prevent (or reduce the possibility of) a situation in which the second bias voltage ($OUT_{12}$) 345 supplied by the first power supplier (e.g., the first power supplier 340 of FIG. 3) and the third bias voltage ($OUT_{21}$) 353 supplied by the second power supplier (e.g., the second power supplier 350 of FIG. 3) are outputted at the same time. In this case, it is possible to prevent (or reduce the possibility of) an internal circuit from being burned out due to the occurrence of a short caused by the simultaneous output of the two bias voltages.

Figure 6:
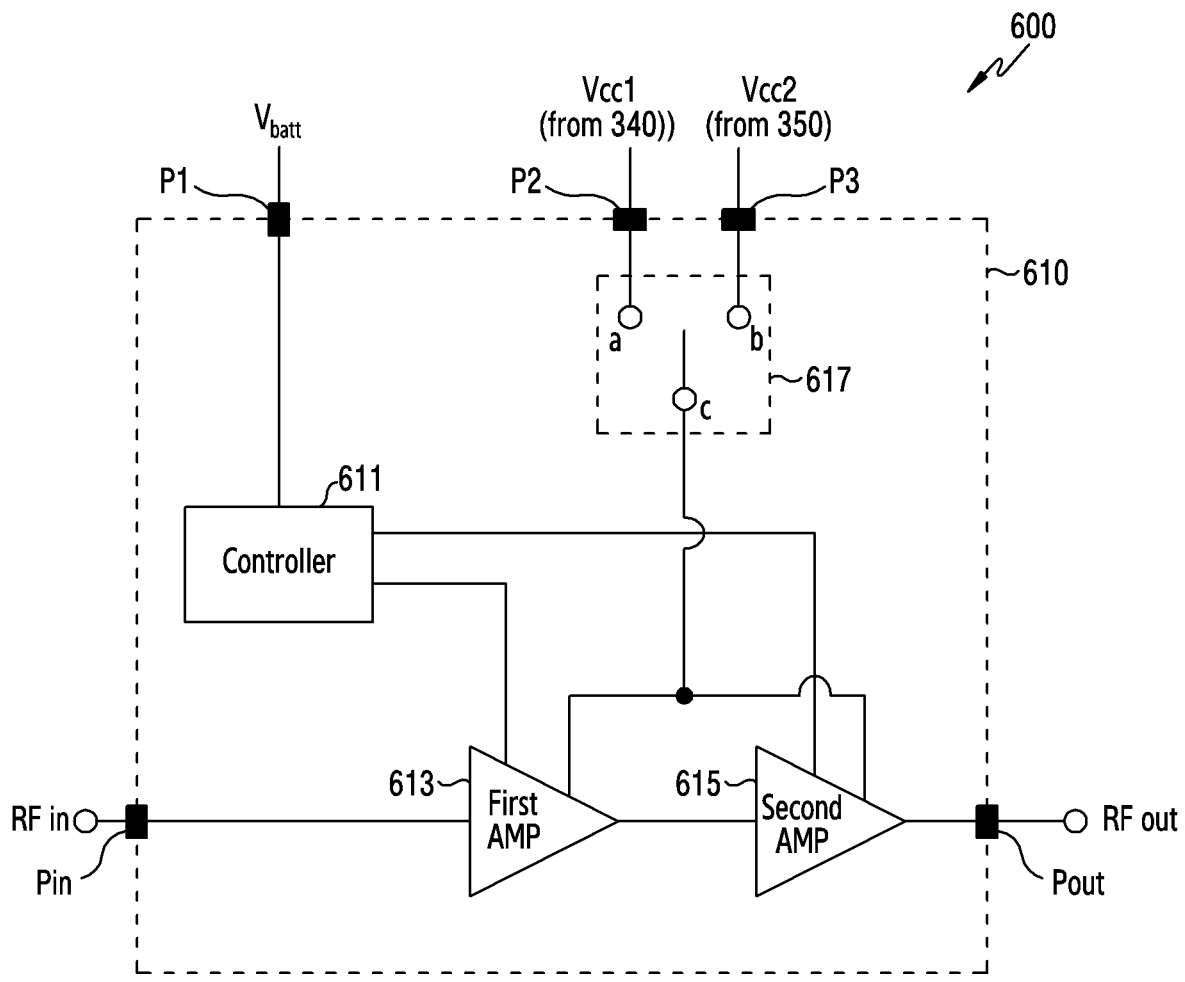
FIG. 6 is a diagram illustrating a construction of a bias circuit of a power amplification module included in an electronic device according to various embodiments of the present disclosure.

FIG. 6 is a diagram 600 illustrating a construction of a bias circuit of a power amplification module (PAM) (e.g., the second transmission module 320 of FIG. 3) included in an electronic device (e.g., the electronic device 101 of FIG. 1) according to various embodiments.

Referring to FIG. 6, the PAM 610 (e.g., the second transmission module 320 of FIG. 3) of an embodiment may include at least one of three bias pins (P1, P2, and P3), one input pin (Pin), and/or one output pin (Pout). In an embodiment, the PAM 610 may further include a controller 611, a first AMP 613, a second AMP 615, and/or a switch 617 (e.g., the switch circuit 360 of FIG. 3). For example, the first AMP 613 may be a drive amplifier, and the second AMP 615 may be a main amplifier.

According to an embodiment, the three bias pins (P1, P2, and P3) may include a first bias pin (P1) to which a first bias voltage ($V_{batt}$) for controlling a bias current is inputted, a second bias pin (P2) to which a second bias voltage (Vcc1) for driving the first AMP 613 corresponding to the drive amplifier is inputted, and/or a third bias pin (P3) to which a third bias voltage (Vcc2) for driving the second AMP 615 corresponding to the main amplifier is inputted.

According to an embodiment, the first bias voltage ($V_{batt}$) inputted to the first bias pin (P1) may be provided to the controller 611, and the second bias voltage (Vcc1) inputted to the second bias pin (P2) may be provided to the first terminal (a) of the switch 617, and the third bias voltage (Vcc2) inputted to the third bias pin (P3) may be provided to the second terminal (b) of the switch 617.

According to an embodiment, the switch 617 may supply one of the second bias voltage (Vcc1) inputted to the first terminal (a) and the third bias voltage (Vcc2) inputted to the second terminal (b), as a bias voltage for driving the first AMP 613 and the second AMP 615. The switch 617 may, for example, be implemented to, after connecting the pins as one within the module without changing the pins included in the module for receiving the bias voltages (Vcc) of the first AMP 613 and the second AMP 615, supply a bias voltage from one power supplier selected among two power suppliers (e.g., the first and second power suppliers 340 and 350 of FIG. 3) to the first AMP 613 and the second AMP 615 through the third terminal (c).

According to various embodiments, an electronic device (e.g., the electronic device 101 of FIG. 1) may include a wireless communication circuit (e.g., the RFIC 220 of FIG. 2), a switch (e.g., the switch 360 of FIG. 3) which performs switching, using at least two bias voltages (e.g., the second bias voltage (OUT$_{12}$) 345 and the third bias voltage (OUT$_{21}$) 353) inputted from a plurality of power suppliers (e.g., the first power supplier 340 and the second power supplier 350 of FIG. 3) as inputs thereto and one (e.g., the fifth bias voltage 361 of FIG. 3) of the two bias voltages as an output therefrom, and a first power amplifier (e.g., the transmission module 320 of FIG. 3) which is electrically connected to the wireless communication circuit, and is included in at least one first transmission chain among a plurality of transmission chains, and amplifies a radio frequency signal (e.g., the second RF signal (RF_in 2) 321 of FIG. 3) for transmission based on the bias voltage (e.g., the fifth bias voltage 361 of FIG. 3) supplied from the switch.

According to various embodiments, the switch may be disposed in an integrated circuit (e.g., the PAM 610 of FIG. 6) including the first power amplifier.

According to various embodiments, the electronic device may further include a first power supplier (e.g., the first power supplier 340 of FIG. 3) which supplies a first bias voltage (e.g., the second bias voltage (OUT$_{12}$) 345) that is one of the at least two bias voltages, based on a first envelope detection signal (e.g., the first envelope detection signal (ET_DAC 1) 341 of FIG. 3) acquired through envelope tracking of the radio frequency signal, and a second power supplier (e.g., the second power supplier 350 of FIG. 3) which supplies a second bias voltage (e.g., the third bias voltage (OUT$_{21}$) 353) that is the other one of the at least two bias voltages, based on a second envelope detection signal (e.g., the second envelope detection signal (ET_DAC 12) 351 of FIG. 3) acquired through envelope tracking of the radio frequency signal.

According to various embodiments, the electronic device may include a second power amplifier (e.g., the first transmission module 310 of FIG. 3) which is included in a second transmission chain that is one of the plurality of transmission chains, and amplifies a radio frequency signal (e.g., the first RF signal (RF_in 1) 311 of FIG. 3) for transmission based on the bias voltage (e.g., the first bias voltage (OUT$_{11}$) 343) supplied from the first power supplier, and a third power amplifier (e.g., the third transmission module 330 of FIG. 3) which is included in a third transmission chain that is one of the plurality of transmission chains, and amplifies a radio frequency signal (e.g., the third RF signal (RF_in 3) 331) for transmission based on the bias voltage (e.g., the fourth bias voltage (OUT$_{22}$) 355) supplied from the second power supplier.

According to various embodiments, the switch, the first and second power suppliers, the first to third power amplifiers may be located on one printed circuit board (e.g., reference numeral 300 of FIG. 3).

According to various embodiments, one of the first power supplier and the second power supplier may be an envelope tracking modulator, and the other one of the first power supplier and the second power supplier may be either an envelope tracking modulator or an average power tracker.

According to various embodiments, the first power amplifier may be shared for dual transmission to heterogeneous networks.

According to various embodiments, the first power amplifier may include a drive amplifier (e.g., the first AMP 613 of FIG. 6) and a main amplifier (e.g., the second AMP 615 of FIG. 6) coupled in series, and the bias voltage supplied from the switch may be supplied to the drive amplifier and the main amplifier.

According to various embodiments, an electronic device (e.g., the electronic device 101 of FIG. 1) may include at least one processor (e.g., the at least one processor 210 of FIG. 2), a radio frequency integrated circuit (RFIC) (e.g., the RFIC 220 of FIG. 2) for up-converting a baseband signal provided by the at least one processor into a radio frequency signal, and a front-end module (e.g., the FEM 230 of FIG. 2) for transmitting the radio frequency signal up-converted by the RFIC through multiple antennas (e.g., the plurality of antennas 240-1, 240-2 . . . 240-$k$ of FIG. 2). The front-end module may include a first power supplier (e.g., the first power supplier 340 of FIG. 3) supplying first and second bias voltages (e.g., the first and second bias voltages (OUT$_{11}$ and OUT$_{12}$) 343 and 345 of FIG. 3), based on a first envelope detection signal (e.g., the first envelope detection signal (ET_DAC 1) 341 of FIG. 3) provided by the at least one processor, a second power supplier (e.g., the second power supplier 350 of FIG. 3) supplying third and fourth bias voltages (e.g., the third and fourth bias voltages (OUT$_{21}$ and OUT$_{22}$) 353 and 355 of FIG. 3), based on a second envelope detection signal (e.g., the second envelope detection signal (ET_DAC 2) 351 of FIG. 3) provided by the at least one processor, a switch (e.g., the switch circuit 360 of FIG. 3) using the second bias voltage (e.g., the second bias voltage (OUT$_{12}$) 345 of FIG. 3) and the third bias voltage (e.g., the third bias voltage (OUT$_{21}$) 353 of FIG. 3) as inputs thereto, and outputting one of the second bias voltage and the third bias voltage as a fifth bias voltage (e.g., the fifth bias voltage 361 of FIG. 3), a first transmission module (e.g., the first transmission module 310 of FIG. 3) for amplifying a radio frequency signal (e.g., the first RF signal (RF_in 1) 311) up-converted by the RFIC using the first bias voltage (e.g., the first bias voltage (OUT$_{11}$) 343 of FIG. 3) outputted from the first power supplier, a second transmission module (e.g., the second transmission module 320 of FIG. 3) for amplifying a radio frequency signal (e.g., the second RF signal (RF_in 2) 321) up-converted by the RFIC using the fifth bias voltage outputted from the switch, and a third transmission module (e.g., the third transmission module 330 of FIG. 3) for amplifying a radio frequency signal (e.g., the third RF signal (RF_in 13) 331) up-converted by the RFIC using the fourth bias voltage (e.g., the fourth bias voltage (OUT$_{22}$) 355 of FIG. 3) outputted from the second power supplier.

According to various embodiments, the switch may be disposed in an integrated circuit (e.g., the PAM 610 of FIG. 6) including the second transmission module.

According to various embodiments, the first, second, and third transmission modules may include a power amplifier which is driven by the bias voltage outputted from the first power supplier, the second power supplier, or the switch.

According to various embodiments, the power amplifier includes a drive amplifier (e.g., the first AMP 613 of FIG. 6) and a main amplifier (e.g., the second AMP 615 of FIG. 6) coupled in series, and the bias voltage outputted from the first power supplier, the second power supplier or the switch may be supplied to the drive amplifier and the main amplifier.

According to various embodiments, one of the first power supplier and the second power supplier may be an envelope tracking modulator, and the other one of the first power supplier and the second power supplier may be one of an envelope tracking modulator or an average power tracker.

According to various embodiments, an electronic device (e.g., the electronic device 101 of FIG. 1) may include a wireless communication circuit (e.g., the RFIC 220 of FIG. 2), a first power supplier (e.g., the first power supplier 340 of FIG. 3) supplying a first bias voltage (e.g., the second bias voltage (OUT$_{12}$) 345), a second power supplier (e.g., the second power supplier 350 of FIG. 3) supplying a second bias voltage (e.g., the third bias voltage (OUT$_{21}$) 353), a switch (e.g., the switch circuit 360 of FIG. 3) using the first bias voltage supplied from the first power supplier and the second bias voltage supplied from the second power supplier as inputs thereto, and supplying one of the first bias voltage and the second bias voltage as a third bias voltage (e.g., the fifth bias voltage 361 of FIG. 3), a first power amplifier (e.g., the second transmission module 320 of FIG. 3) included in at least one first transmission chain among a plurality of transmission chains, and amplifying a radio frequency signal (e.g., the second RF signal (RF_in 2) 321 of FIG. 3) based on the third bias voltage supplied from the switch, and an antenna (e.g., Ant_2 of FIG. 3) outputting the radio frequency signal (e.g., the RF signal 323 of FIG. 3) amplified by the power amplifier.

According to various embodiments, the switch may be disposed in an integrated circuit (e.g., the PAM 610 of FIG. 6) including the power amplifier.

According to various embodiments, the electronic device may include a second power amplifier (e.g., the first transmission module 310 of FIG. 3) included in a second transmission chain, which is one of the plurality of transmission chains, and amplifying a radio frequency signal (e.g., the first RF signal (RF_in 1) 311 of FIG. 3) based on a fourth bias voltage (e.g., the first bias voltage (OUT$_{11}$) 343) supplied from the first power supplier, and a third power amplifier (e.g., the third transmission module 330 of FIG. 3) included in a third transmission chain, which is one of the plurality of transmission chains, and amplifying a radio frequency signal (e.g., the third RF signal (RF_in 3) 331 of FIG. 3) based on a fifth bias voltage (e.g., the third bias voltage (OUT$_{21}$) 353) supplied from the second power supplier.

According to various embodiments, the switch, the first and second power suppliers, and the first, second, and third power amplifiers may be located on one printed circuit board (reference numeral 300 in FIG. 3).

According to various embodiments, one of the first power supplier and the second power supplier may be an envelope tracking modulator, and the other of the first power supplier and the second power supplier may be one of an envelope tracking modulator or an average power tracker.

According to various embodiments, the first power amplifier may be shared for dual transmission to heterogeneous networks.

According to various embodiments, the first power amplifier may include a drive amplifier (e.g., the first AMP 613 of FIG. 6) and a main amplifier (e.g., the second AMP 615 of FIG. 6) coupled in series, and the third bias voltage supplied from the switch may be supplied to the drive amplifier and the main amplifier.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" refers, for example, to the storage medium being a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a wireless communication circuit;
a first power supplier configured to supply a first bias voltage;
a second power supplier configured to supply a second bias voltage;
a switch configured to select one of at least two bias voltages including the first bias voltage and the second bias voltage inputted as inputs thereto and to output the selected one of the at least two bias voltages; and
a second power amplifier which is electrically connected to the wireless communication circuit and is included in a second RF transmission chain among a plurality of RF transmission chains, and which is configured to amplify a second radio frequency signal for transmission based on the selected one of the at least two bias voltages output from the switch.

2. The electronic device of claim 1, wherein the switch is disposed in an integrated circuit comprising the second power amplifier.

3. The electronic device of claim 1, further comprising:
a first power amplifier which is electrically connected to the wireless communication circuit and is included in a first RF transmission chain among the plurality of RF transmission chains, and which is configured to amplify a first radio frequency signal for transmission based on the first bias voltage supplied from the first power supplier.

4. The electronic device of claim 3, further comprising:
a third power amplifier which is electrically connected to the wireless communication circuit and is included in a third RF transmission chain among the plurality of RF transmission chains, and which is configured to amplify a third radio frequency signal for transmission based on the second bias voltage supplied from the second power supplier.

5. The electronic device of claim 4, wherein a second frequency of the second radio frequency signal is higher than a first frequency of the first radio frequency signal.

6. The electronic device of claim 5, wherein the second frequency of the second radio frequency signal is lower than a third frequency of the third radio frequency signal.

7. The electronic device of claim 6, wherein the first radio frequency signal includes a LB (low band) signal, the second radio frequency signal includes a MHB (mid-high band) signal, and the third radio frequency signal includes a UHB (ultra-high band) signal.

8. The electronic device of claim 4, wherein the first bias voltage is supplied to the first power amplifier and the second bias voltage is supplied though the switch to the second power amplifier such that the first power amplifier amplifies the first radio frequency signal and the second power amplifier amplifies the second radio frequency signal for carrier aggregation.

9. The electronic device of claim 8, wherein the first radio frequency signal amplified by the first power amplifier is transmitted with the second radio frequency signal amplified by the second power amplifier.

10. The electronic device of claim 4, wherein the first bias voltage is supplied though the switch to the second power amplifier and the second bias voltage is supplied to the third power amplifier such that the second power amplifier amplifies the second radio frequency signal and the third power amplifier amplifies the third radio frequency signal for carrier aggregation.

11. The electronic device of claim 10, wherein the second radio frequency signal amplified by the second power amplifier is transmitted with the third radio frequency signal amplified by the third power amplifier.

12. The electronic device of claim 11, wherein the electronic device further comprising:
a first antenna electrically connected to the first power amplifier;
a second antenna electrically connected to the second power amplifier; and
a third antenna electrically connected to the third power amplifier.

* * * * *